United States Patent
Ning et al.

(10) Patent No.: US 12,188,864 B2
(45) Date of Patent: Jan. 7, 2025

(54) GAS SENSOR PROBE HAVING MULTIPOINT REFLECTION RECTANGULAR ABSORPTION CELL, AND DETECTION DEVICE

(71) Applicant: LASER INSTITUTE OF SHANDONG ACADEMY OF SCIENCE, Shandong (CN)

(72) Inventors: Yanong Ning, Shandong (CN); Tongyu Liu, Shandong (CN); Yanfang Li, Shandong (CN); Guangxian Jin, Shandong (CN); Bo Cai, Shandong (CN); Tingting Zhang, Shandong (CN)

(73) Assignee: LASER INSTITUTE OF SHANDONG ACADEMY OF SCIENCE, Shandong (CN)

( * ) Notice: Subject to any disclaimer, the term of this patent is extended or adjusted under 35 U.S.C. 154(b) by 262 days.

(21) Appl. No.: 17/789,924

(22) PCT Filed: Dec. 31, 2019

(86) PCT No.: PCT/CN2019/130637
§ 371 (c)(1),
(2) Date: Jun. 29, 2022

(87) PCT Pub. No.: WO2021/134518
PCT Pub. Date: Jul. 8, 2021

(65) Prior Publication Data
US 2023/0038018 A1     Feb. 9, 2023

(51) Int. Cl.
*G01N 21/39*     (2006.01)

(52) U.S. Cl.
CPC .................................. *G01N 21/39* (2013.01)

(58) Field of Classification Search
CPC ........................................................ G01N 21/39
See application file for complete search history.

(56) References Cited

FOREIGN PATENT DOCUMENTS

| CN | 103134769 | A |   | 6/2013  |              |
|----|-----------|---|---|---------|--------------|
| CN | 104122223 | A |   | 10/2014 |              |
| CN | 108051404 | A |   | 5/2018  |              |
| CN | 108931504 | A | * | 12/2018 | ... G01N 21/61 |
| DE | 102014012364 | A1 | * | 2/2016 | ... G01N 9/00 |
| FR | 2767195   | A1 |   | 2/1999  |              |

* cited by examiner

*Primary Examiner* — Jamil Ahmed
(74) *Attorney, Agent, or Firm* — Bret E. Field; Bozicevic, Field & Francis LLP

(57) ABSTRACT

A gas sensor probe having multipoint reflection rectangular absorption cell, a VCSEL laser emitter and a detection device. The probe comprises: an upper cover plate, the surface of the upper cover plate being provided with gas diffusion holes, and a metal filtering screen being provided above the gas diffusion holes; a lower cover plate located under the upper cover plate and detachably connected to the upper cover plate, and an electric wire through hole being formed in the bottom of the lower cover plate; a light path module located in an internal space defined by the upper cover plate and the lower cover plate and used for modulating the laser emitter and collecting a detection signal; and an electronic processing circuit board located in the internal space defined by the upper cover plate and the lower cover plate, located below the light path module, electrically connected to the light path module, and used for processing the signal generated from the light path module.

9 Claims, 2 Drawing Sheets

GAS SENSOR PROBE HAVING MULTIPOINT REFLECTION RECTANGULAR ABSORPTION CELL, AND DETECTION DEVICE

FIELD OF THE PRESENT DISCLOSURE

The present invention relates to the technical field of laser spectral gas sensors, and more particularly to a gas sensor probe having a multipoint reflection rectangular absorption cell, and a gas detection device using the probe.

BACKGROUND OF THE PRESENT DISCLOSURE

With the emergence of a variety of new multi-wavelength lasers, the photoelectric detection technology using the infrared laser spectral absorption principle to measure gas composition and concentration has also been developed rapidly. The gas sensor manufactured based on this kind of technology has many excellent characteristics, such as a wide range of measured gas concentration, high measurement precision, and no need for frequent correction, which will play a positive role in promoting the wide application of laser spectral gas sensors to different production processes and safety protections.

The infrared laser spectral absorption gas sensor based on the tunable diode laser absorption spectroscopy (TDLAS) has been paid more and more attention. Its working principle is that according to the different characteristic spectral absorption peaks of different gases, by properly selecting the wavelength value of the characteristic spectral absorption peak of the measured gas and matching the laser source with the same wavelength, the precise measurement of the specific gas concentration can be achieved. When the infrared laser passes through the measured gas, its light intensity will decrease due to the absorption effect of the characteristic spectral absorption peak. The amplitude of this decrease in the light intensity is in direct proportion to the concentration of the measured gas and the optical path length value of the light beam interacting with the gas. Therefore, when the optical path length value is a known fixed value, the concentration of the measured gas can be detected by detecting and analyzing the light intensity change value at the infrared absorption peak.

The process of detecting the light intensity at the infrared absorption peak is mainly performed in a gas absorption cell (or gas cell) in a gas sensor, and the gas absorption cell (or gas cell) generally refers to a space formed between a light source and a detector. The optical path length of the measured light beam in the gas absorption cell is usually limited by the size of the volume of the absorption cell. In order to increase the optical path length of the measured light beam, multiple mirrors or reflectors are arranged in the gas absorption cell such that the measured light beam is reflected several times before reaching the detector. The gas absorption cell commonly used in the prior art includes the traditional White cell, Herriott cell, modifications thereof, and the like.

However, in practical applications, the above-mentioned absorption cells are all composed of an optical light path with a three-dimensional stereo structure. The optical structure of the sensor thereof is very complicated, and the volume of the absorption cell is also relatively large, which cannot be applied to an application scenario requiring a small volume of the sensor. Furthermore, if there is any change in the relative position of an optical element, the measurement precision of the whole sensor may be greatly affected such that sensors in the prior art do not have high environmental stability. In addition, the more optical elements are used, the more complexity of the production process and the higher the rejection rate are inevitably caused, making the cost reduction and mass production disadvantageous.

SUMMARY OF THE PRESENT DISCLOSURE

It is an object of the present invention to provide a gas sensor probe having a multipoint reflection rectangular absorption cell and a detection device, a laser emitter to solve the problems of the prior art, such as a sensor having a complicated structure, not being easy to install, being expensive to manufacture, and being unsuitable for small-sized sensor device.

In the first aspect, the present application provides a gas sensor probe having a multipoint reflection rectangular absorption cell, comprising:
an upper cover plate, wherein a surface of the upper cover plate is provided with gas diffusion holes, and a metal filtering screen is provided above the gas diffusion hole;
a lower cover plate located directly below the upper cover plate and detachably connected to the upper cover plate; wherein a circuit through hole is provided at a bottom of the lower cover plate;
a light path module located in an internal space enclosed by the upper cover plate and lower cover plate for collecting a detection signal; and
an electronic processing circuit board located in the internal space enclosed by the upper cover plate and the lower cover plate and located below the light path module and electrically connected to the light path module for adjusting the light path module.
Optionally, the light path module comprises:
a die holder, wherein an upper surface of the die holder is provided with a rectangular semi-hollow groove; two adjacent corner angles of the semi-hollow groove are respectively provided with a first equipment groove and a second equipment groove;
four reflective mirrors located respectively on four side walls of the semi-hollow groove, the length ratios of the four mirrors are 8:10:10:10 respectively;
a laser emitter located within the first equipment groove for emitting laser to one of the reflective mirrors;
and a photodetector located in the second equipment groove for receiving the laser reflected by the reflective mirrors.

Optionally, the bottom of the die holder is provided with a measuring hole; a temperature sensor and a pressure sensor are installed in the measuring hole.

Optionally, the laser emitter is a vertical-cavity surface-emitting laser or a distributed feedback laser.

Optionally, the receiving end of the photodetector is provided with a focusing lens.

Optionally, cross sections of the upper cover plate and the lower cover plate are circular, elliptical, or rectangular.

Optionally, the inner walls of the upper cover plate, the semi-hollow groove, the first equipment groove, and the second equipment groove are coated with a light-absorbing anti-corrosive coating.

Optionally, the included angle between the laser emitted by the laser emitter and the reflective mirror is 45°; the included angle between the direction in which the photodetector receives the laser and the reflective mirror is 45°; the length-width ratio of the semi-hollow groove is 1.1:1.

Optionally, the die holder is made of a rigid material.

In the second aspect, the present application provides a gas detection device adopting the gas sensor probe having a multipoint reflection rectangular absorption cell.

The gas sensor probe having a multipoint reflection rectangular absorption cell, a laser emitter and the detection device provided by the present application have the following beneficial effects.

1. The square gas absorption cell of the photoelectric gas sensor probe adopts a four-mirror multi-point light beam reflection structure, which greatly reduces the possibility of relative position change of each optical element, and has a stable mechanical structure, and is easy to be processed and produced.

2. The parallel light beam from the laser emitter undergoes multiple reflections from four mutually perpendicular mirrors, effectively increasing the measurement optical path of the absorption gas in a small gas absorption cell space, which can increase the signal-to-noise ratio of the detection signal and the measurement precision.

3. By combining the two-dimensional light path structure with four reflective mirrors, the absorbing light path is multi-reflected within the four mirrors, the volume of the sensor probe is reduced, and the volume of the gas absorption cell is also reduced, thereby effectively reducing the response time for measuring the gas concentration.

4. Since the four reflective mirrors only need to be directly pasted and fixed on the four borders of the rectangle to form one complete solid structure, not only the manufacturing process of the absorption cell is simplified and the complexity of the gas absorption cell production is effectively reduced, but also the production yield is correspondingly improved to facilitate mass production.

BRIEF DESCRIPTION OF THE DRAWINGS

In order to illustrate the technical scheme of the present application more clearly, the following will briefly introduce the drawings needed in the embodiments. Obviously, for those of ordinary skills in the art, without involving creative efforts, other drawings can also be obtained from these drawings.

DESCRIPTION OF THE EMBODIMENTS

Figure 1:
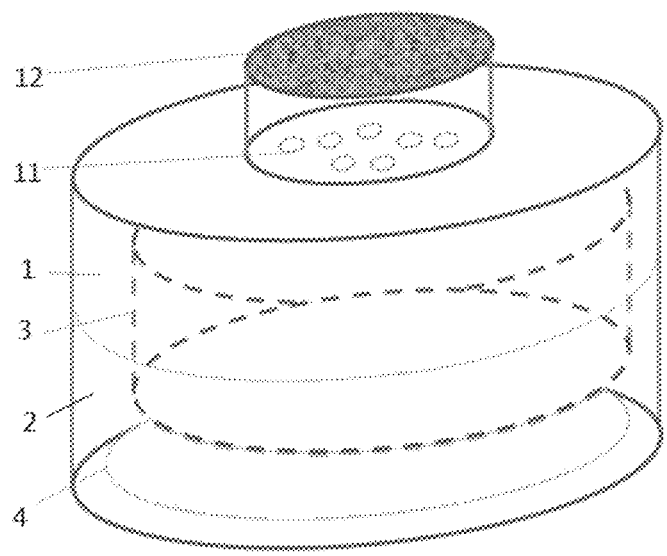
FIG. 1 is a schematic view of an overall structure of a gas sensor probe having a multipoint reflection rectangular absorption cell according to the present application.

With reference to FIG. 1, there is a schematic view of an overall structure of a gas sensor probe having a multipoint reflection rectangular absorption cell according to the present application.

It can be seen from FIG. 1 that an embodiment of the present application provides a gas sensor probe having a multipoint reflection rectangular absorption cell, comprising an upper cover plate 1 and a lower cover plate 2 which are detachably connected in up and down direction. The upper cover plate 1 and the lower cover plate 2 are covered in up and down direction, and a spatial structure with a set size can be formed inside for placing a sensor assembly.

The surface of the upper cover plate 1 is provided with a gas diffusion hole 11, and the gas diffusion hole 11 provides the function of introducing the gas around the sensor into the sensor so as to be detected. In the present embodiment, the shape, size, and number of the gas diffusion hole are not particularly limited, for example, the case that the gas diffusion holes can be set as small circular holes with a preset diameter uniformly distributed in a designated area range of the center of the upper cover plate 1, so as to ensure that the gas to be detected entering the sensor reaches a designated amount required for the detection. A metal filtering screen 12 is provided above the gas diffusion hole 11, and the metal filtering screen 12 is mainly used for isolating dust, impurities, preventing impurities, etc. from entering the sensor to contaminate various optical elements in the light path, thereby improving the service life of the equipment.

Figure 2:
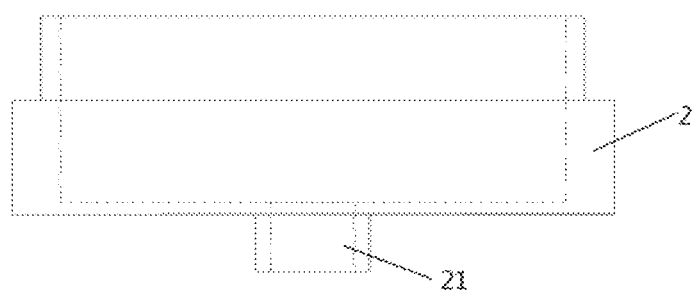
FIG. 2 is a cross-sectional view of a lower cover plate of the probe of FIG. 1.

Referring to FIG. 2, a cross-sectional view of the lower cover plate of FIG. 1 is shown.

The lower cover plate 2 is mainly used for bearing optical elements and circuit components, etc. located in the internal space, and is provided with a circuit through hole 21 at the bottom. The circuit through hole 21 is used for leading out a connection wire connecting with the circuit component to a processing unit or an analysis instrument, etc. In the present embodiment, the specific structural form of the circuit through hole is not limited, and can be designed accordingly according to the size of the connection wire. Structures such as a reinforced end for stably fixing the wire and increasing the strength of the wire can also be added.

In an embodiment of the present application, the outer shapes of the upper cover plate 1 and the lower cover plate 2 can be various, such as a cylinder, an elliptical cylinder, a cuboid, etc. and accordingly, the cross section can be circular, elliptical, rectangular, or other possible shapes. In practical applications, different shapes can be selected to form the upper cover plate 1 and the lower cover plate 2 as desired.

Figure 3:
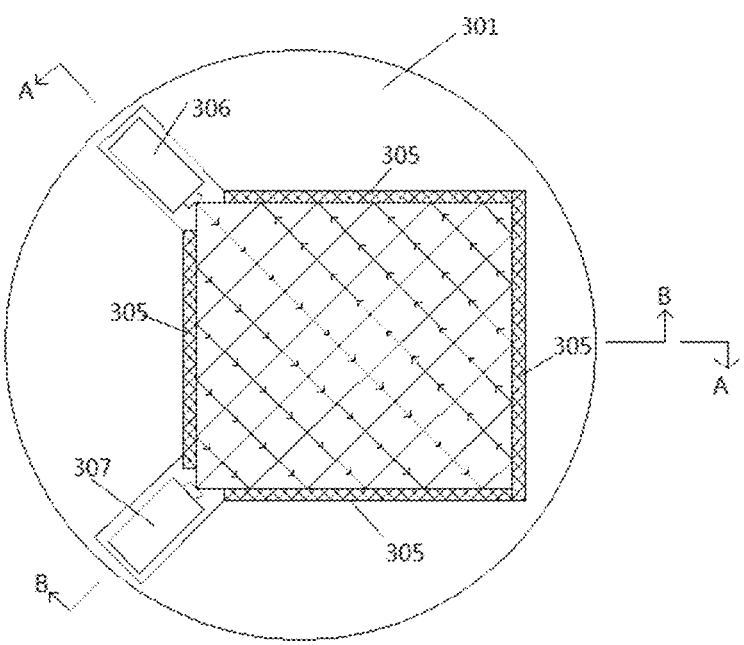
FIG. 3 is a schematic view of a partial structure of a light path module in the probe of FIG. 1 according to an embodiment.
Figure 4:
FIG. 4 is a cross-sectional view taken along the line A-A in FIG. 3.
Figure 5:
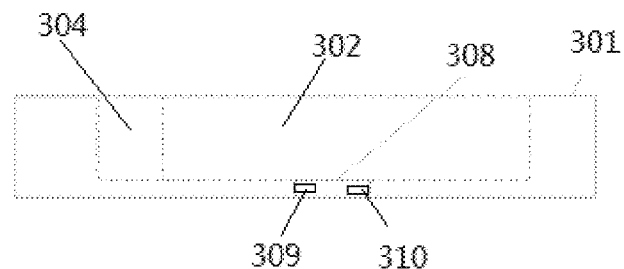
FIG. 5 is a sectional view taken along the line B-B in FIG. 3.

The light path module 3 is located in the internal space enclosed by the upper cover plate 1 and the lower cover plate 2 for collecting a detection signal. In the present embodiment, the light path module 3 is a key component for providing a detection function, which can be designed as one solid and rigid cylinder structure. A rectangular semi-hollow structure is machined on the cylinder structure to serve as a gas absorption cell. The purpose of collecting a detection signal is achieved by emitting laser into the gas absorption cell and collecting the reflected laser. Specifically, the structural form of the light path module 3 can be various, and it can be seen from FIG. 3 to FIG. 5 that in a feasible embodiment, the light path module 3 comprises a die holder 301, wherein the upper surface of the die holder 301 is provided with a rectangular semi-hollow groove 302.

It needs to be noted that the outer dimension of the die holder 301 can be determined according to the shapes of the upper cover plate 1 and the lower cover plate 2. For example, if the upper cover plate and the lower cover plate are cylinders, then the die holder 301 is preferably also provided as a cylinder; and if the upper cover plate and lower cover plate are cubes, then the die holder 301 should also be provided as a cube, which is more convenient for installation. The rectangular semi-hollow groove 302 provides the space occupied by the gas absorption cell, and is arranged as a rectangle because adjacent sides of the rectangle are perpendicular to each other, and therefore, arranging a reflective mirror along the side of the rectangle enables the laser to reflect at a specific angle, so as to facilitate the control of the number of reflections and the direction of the optical path.

Further, in the present embodiment, the die holder 301 is made of a rigid material, for example, metal, hard plastic, composite material, etc., so that the manufactured die holder has high structural strength. On the one hand, the die holder can be stably fixed to the internal space formed by the upper cover plate and lower cover plate, and on the other hand, the stability of the optical component fixed to the die holder can be ensured such that the scenario that the optical path direction of the laser can be changed and the reception of the laser can be affected due to the positional deviation of the optical element can be avoided.

The reflective mirrors 305 are provided on four side walls of the semi-hollow groove 302, namely, the width of the reflective mirror 305 does not exceed the side walls of the semi-hollow groove 302. In the present embodiment, the laser path for measurement in the gas absorption cell (in the present application, the gas absorption cell refers to a structure space that is enclosed by the semi-hollow groove with the side walls provided with the reflective mirrors and the upper cover plate 1) is designed as a two-dimensional distribution structure, namely, the reflected lasers are all located on the same horizontal plane. Therefore, the width of the reflective mirror 305 does not need to be designed to be very large to meet the measurement requirements, and the depth of the corresponding semi-hollow groove 302 does not need to be very large, which allows the die holder 301 with a small thickness to perform the measurement task, minimizing the design thickness of the sensor probe to the maximum extent. In addition, the designing of two-dimensional distribution of the light path not only reduces the volume of the absorption cell, but also does not need to consider the instability of the multi-dimensional distributed light path, which increases the stability of the light path structure.

In addition, the connecting form between the reflective mirror 305 and the side wall of the semi-hollow groove 302 can be various. In order to reduce the complexity of the design, the back surface of the reflective mirror 305 can directly adhere to the side wall.

In the present embodiment, by arranging the reflective mirror 305 along the rectangular semi-hollow groove 302, the incident laser can be collected in a specific direction after multiple reflections, and optical paths of different shapes are formed in the inner area of the semi-hollow groove 302 at the same time. The difference of the optical path lines is determined by the incident angle of the laser and the side ratio of the rectangle. Under the same side ratio of the rectangle, if the incident angle is changed, and the number of reflections and the total length of the optical path may be changed; therefore, according to different practical requirements, the rectangular length-width ratio of the semi-hollow groove 302 can be set accordingly. In the present application, the incident angle of the laser is not limited to the same numerical value, but can be correspondingly selected in an optional range according to the length-width ratio of the semi-hollow groove 302, for example, the incident angle can be selected in the range of 30°-60°, the length-width ratio of the semi-hollow groove 302 is selected between 1-2:1, etc. However, in practical applications, in order to obtain a higher detection effect, it is usually required to have a long optical path total length in a minimum space and a compact optical path configuration. Therefore, in a preferred embodiment shown in FIG. 3, the included angle between the laser beam emitted by the laser emitter 306 and the reflective mirror 305 is 45°; the included angle between the direction in which the photodetector 307 receives the laser and the reflective mirror 305 is 45°; the length-width ratio of the semi-hollow groove 302 is 1.1:1. At this moment, due to the setting of the length-width ratio of the semi-hollow groove 302, the length ratio between the four reflective mirrors 305 located at the four sides are correspondingly set to be 8:10:10:10. When the laser emitter 306 emits laser, 19 times of reflection are successively performed, and then the laser is received by the photodetector 307 so as to form a complete detection light path. It can be seen that the optical path distribution under this embodiment is relatively uniform and relatively compact, and the total length of the optical path is relatively high, namely, the contact area with the gas is relatively large, which has a relatively high detection effect and is beneficial to improving the detection precision.

Two adjacent corner angles of the semi-hollow groove 302 are respectively provided with a first equipment groove 303 and a second equipment groove 304, namely, notches of the first equipment groove 303 and the second equipment groove 304 are respectively in communication with two adjacent angular positions of the semi-hollow groove 302; wherein a laser emitter 306 is provided in the first equipment groove 303, and the laser emitter 306 can emit laser into the semi-hollow groove 302, and specifically, a specific angle can be set so that the laser is emitted to one of the reflective mirrors 305 at a set angle.

A photodetector 307 is arranged in the second equipment groove 304 for receiving laser reflected by the reflective mirror 305. Specifically, the receiving end of the photodetector 307 is oriented to face inside the semi-hollow groove 302, and can correspondingly set the receiving angle of itself according to the angle after the laser reflection.

The fixing manner of the laser emitter 306 and photodetector 307 in this embodiment in their respective grooves can be a fixed connection, such as integrated, one-piece, or can be a detachable connection, such as threaded, hinged, etc., which will not be limited herein.

The laser emitter 306 in the present embodiment can select a corresponding model according to different usage requirements. For example, a vertical-cavity surface-emitting laser or a distributed feedback laser can be selected. The vertical-cavity surface-emitting laser (VCSEL for short, also referred to as vertical cavity surface-emitting laser) is a kind of semiconductor, which is emitted perpendicular to the top surface, being different from the edge-emitting laser that emits the laser from the edge and is made of cut individual chips. The distributed feedback laser provides feedback by making a periodic grating near the laser active waveguide region interface, which is achieved by using a periodic change in the refractive index of the optical waveguide, characterized in that the grating is made directly at the active layer and confinement interface. These lasers not only have excellent performance and ease of integration, but also, after modification, can easily achieve stable single-mode operation.

Further, the laser emitter 306 in the present embodiment can be provided as a tunable parallel laser source, namely, a light intensity detector and a control circuit connected to the light intensity detector are added on the basis of the conventional laser, so as to perform modulation coordination processing on the light intensity of the emitted laser in real-time by monitoring the light intensity.

Therefore, an electronic processing circuit board 4 is further provided in the internal space enclosed by the upper cover plate 1 and the lower cover plate 2. The electronic processing circuit board 4 is located below the light path module 3 and is electrically connected to the light path module 3 for adjusting the light path module 3. The adjusting effect mainly comprises adjusting the light intensity of the laser emitted by the laser source, and further comprises amplifying the measurement signal received by the photodetector 307, and sending the amplified signal, etc.

Furthermore, in a feasible embodiment, the bottom of the die holder 301 is provided with a measuring hole 308. A temperature sensor 309 and a pressure sensor 310 are installed in the measuring hole 308, wherein the temperature sensor 309 is used for measuring a temperature value in the gas absorption cell, and the pressure sensor 310 is used for measuring a pressure value in the gas absorption cell. The temperature value and pressure value information will be used to compensate for parameter variations caused by ambient temperature fluctuations and location variations in order to further improve the measurement precision of the gas to be measured. When the real-time temperature and pressure data are collected by temperature sensor 309 and pressure sensor 310, the data is transmitted to the processing unit through the data cable connected between the probe and processing unit for analysis and displacement.

Furthermore, in a feasible embodiment, the receiving end of the photodetector 307 is provided with a focusing lens (not shown in the figure). The focusing lens can focus the parallel light on the detection sensitive surface, so that the parallel light is converged before the photodetector 307 receives the laser, so as to improve the detection precision.

Furthermore, in a preferred embodiment, the inner walls of the upper cover plate 1, the semi-hollow groove 302, the first equipment groove 303, and the second equipment groove 304 can all be coated with a light-absorbing anti-corrosive coating so as to reduce the influence of stray light and improve detection precision. At the same time, the coating plays an anti-corrosion role and increases the service life of the device. The light-absorbing anti-corrosive coating is typically black in color and may be made, for example, from matte bituminous alkyd paint or bituminous phenolic paint, or may be formed from other materials having similar functions, which will not be limited herein.

It can be seen from the above-mentioned technical solution that the present application provides a gas sensor probe having a multipoint reflection rectangular absorption cell, comprising: an upper cover plate, the surface of the upper cover plate being provided with gas diffusion holes, and a metal filtering screen being provided above the gas diffusion holes; a lower cover plate located under the upper cover plate and detachably connected to the upper cover plate, a circuit through hole being formed in the bottom of the lower cover plate; a light path module located in an internal space defined by the upper cover plate and the lower cover plate and used for collecting a detection signal; and an electronic processing circuit board located in the internal space defined by the upper cover plate and the lower cover plate, located below the light path module, electrically connected to the light path module, and used for adjusting the light path module. The probe is simple in structure, convenient to mount and manufacture, and low in cost. By designing a measuring light path to be of a two-dimensional distribution structure, the volume of the absorption cell is reduced, the structural stability of the light path module is improved, and high detection precision is achieved at the same time.

The present application also provides a gas detection device, in particular, a detection device for methane gas, which may also be used to detect other gases, the device comprising the gas sensor probe as described in any of the preceding embodiments.

What is claimed is:

1. A gas sensor probe having multipoint reflection rectangular absorption cell, comprising:
   an upper cover plate, wherein a surface of the upper cover plate is provided with gas diffusion holes, and a metal filtering screen is provided above the gas diffusion holes;
   a lower cover plate located directly below the upper cover plate and detachably connected to the upper cover plate, wherein a circuit through hole is provided at a bottom of the lower cover plate;
   a light path module located in an internal space enclosed by the upper cover plate and lower cover plate for collecting a detection signal; and
   an electronic processing circuit board located in the internal space enclosed by the upper cover plate and the lower cover plate and located below the light path module and electrically connected to the light path module for adjusting the light path module,
   wherein the light path module comprises:
   a die holder, wherein an upper surface of the die holder is provided with a rectangular semi-hollow groove, and two adjacent corner angles of the semi-hollow groove are respectively provided with a first equipment groove and a second equipment groove;
   four reflective mirrors located on four side walls of the semi-hollow groove;
   a laser emitter located within the first equipment groove for emitting laser to one of the reflective mirrors, wherein an emitting angle of the laser emitter is adjustable; and
   a photodetector located in the second equipment groove for receiving the laser reflected by the reflective mirror, wherein a receiving angle of the photodetector is adjustable.

2. The gas sensor probe having multipoint reflection rectangular absorption cell according to claim 1, wherein the bottom of the die holder is provided with a measuring hole, and the measuring hole has a temperature sensor and a pressure senso installed therein.

3. The gas sensor probe having multipoint reflection rectangular absorption cell according to claim 1, wherein the laser emitter is a vertical-cavity surface-emitting laser or a distributed feedback laser.

4. The gas sensor probe having multipoint reflection rectangular absorption cell according to claim 1, wherein a receiving end of the photodetector is provided with a focusing lens.

5. The gas sensor probe having multipoint reflection rectangular absorption cell according to claim 1, wherein cross sections of the upper cover plate and the lower cover plate are circular, elliptical, or rectangular.

6. The gas sensor probe having multipoint reflection rectangular absorption cell according to claim 1, wherein inner walls of the upper cover plate, the semi-hollow groove, the first equipment groove, and the second equipment groove are coated with a light-absorbing anti-corrosive coating.

7. The gas sensor probe having multipoint reflection rectangular absorption cell according to claim 1, wherein an included angle between the laser beam emitted by the laser emitter and the reflective mirror is 45°; an included angle between a direction in which the photodetector receives the laser and the reflective mirror is 45°; and a length-width ratio of the semi-hollow groove is 1.1:1.

8. The gas sensor probe having multipoint reflection rectangular absorption cell according to claim 1, wherein the die holder is made of rigid material.

9. A gas detection device, wherein the device comprises the gas sensor probe having multipoint reflection rectangular absorption cell according to claim 1.

* * * * *